(12) United States Patent
Knobloch

(10) Patent No.: US 10,904,695 B2
(45) Date of Patent: Jan. 26, 2021

(54) METHOD, COMPUTER-READABLE MEDIUM, SYSTEM, AND VEHICLE COMPRISING THE SYSTEM FOR ASCERTAINING A PLACEMENT REGION OF A MOBILE TERMINAL RELATIVE TO THE VEHICLE

(71) Applicant: Bayerische Motoren Werke Aktiengesellschaft, Munich (DE)

(72) Inventor: Daniel Knobloch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/597,567

(22) Filed: Oct. 9, 2019

(65) Prior Publication Data

US 2020/0045498 A1 Feb. 6, 2020

Related U.S. Application Data

(63) Continuation of application No. PCT/EP2018/051551, filed on Jan. 23, 2018.

(30) Foreign Application Priority Data

Apr. 10, 2017 (DE) .................. 10 2017 206 119

(51) Int. Cl.
*H04W 24/00* (2009.01)
*H04W 4/021* (2018.01)
(Continued)

(52) U.S. Cl.
CPC .......... *H04W 4/021* (2013.01); *H04W 4/023* (2013.01); *H04W 4/029* (2018.02); *H04W 4/40* (2018.02)

(58) Field of Classification Search
CPC ....... H04W 4/021; H04W 4/023; H04W 4/40; H04W 4/029; G01S 5/0284; G01S 5/14;
(Continued)

(56) References Cited

U.S. PATENT DOCUMENTS

2010/0076622 A1* 3/2010 Dickerhoof ............. B60R 25/24
 701/2
2014/0156180 A1 6/2014 Marti et al.
(Continued)

FOREIGN PATENT DOCUMENTS

DE 10 2014 217 504 A1 3/2016
DE 10 2015 211 933 A1 12/2016
(Continued)

OTHER PUBLICATIONS

PCT/EP2018/051551, International Search Report dated Apr. 30, 2018 (Three (3) pages).
(Continued)

*Primary Examiner* — Marcos Batista
(74) *Attorney, Agent, or Firm* — Crowell & Moring LLP

(57) ABSTRACT

A method for determining a location area of a mobile terminal relative to a vehicle includes generating a set of positions relative to the vehicle, calculating a location probability of the mobile terminal for one position from the set of positions, and assigning one position from the set of positions to a zone from a plurality of zones of the vehicle. The method also includes determining an aggregated location probability of the mobile terminal for the zone from the plurality of zones depending on the positions assigned to the zone. And, if the aggregated location probability of the mobile terminal for the zone exceeds a predefined confidence value, the method further comprises determining the zone as the location area of the mobile terminal.

7 Claims, 4 Drawing Sheets

(51) Int. Cl.
*H04W 4/029* (2018.01)
*H04W 4/40* (2018.01)
*H04W 4/02* (2018.01)

(58) Field of Classification Search
CPC ... G01S 11/06; G01S 5/0278; G07C 2209/63; G07C 9/00; G01B 7/00
USPC .............................. 455/456.1–456.3; 370/338
See application file for complete search history.

(56) References Cited

U.S. PATENT DOCUMENTS

2015/0360564 A1* 12/2015 Kalbus .................... H04W 4/48
 701/36
2017/0280302 A1* 9/2017 Dickow ................ B60W 40/08

FOREIGN PATENT DOCUMENTS

DE 11 2015 002 999 T5 3/2017
WO WO 2013/154679 A1 10/2013

OTHER PUBLICATIONS

German Search Report issued in German counterpart application No. 10 2017 206 119.7 dated Dec. 8, 2017, with Statement of Relevancy (Twelve (12) pages).
Pei et al., "Using Inquiry-based Bluetooth RSSI Probability Distribution for Indoor Positioning", *Journal of Global Positioning Systems*, 2010, vol. 9, No. 2, pp. 122-130.

\* cited by examiner

METHOD, COMPUTER-READABLE MEDIUM, SYSTEM, AND VEHICLE COMPRISING THE SYSTEM FOR ASCERTAINING A PLACEMENT REGION OF A MOBILE TERMINAL RELATIVE TO THE VEHICLE

CROSS REFERENCE TO RELATED APPLICATIONS

This application is a continuation of PCT International Application No. PCT/EP2018/051551, filed Jan. 23, 2018, which claims priority under 35 U.S.C. § 119 from German Patent Application No. 10 2017 206 119.7, filed Apr. 10, 2017, the entire disclosures of which are herein expressly incorporated by reference.

BACKGROUND AND SUMMARY OF THE INVENTION

The invention relates to a method for determining a location area of a mobile terminal relative to a vehicle. The invention furthermore relates to a computer-readable medium, to a system, and to a vehicle comprising the system for determining a location area of a mobile terminal relative to the vehicle.

Mobile devices are able to be used to control various functions of a vehicle. To this end, it is often necessary to determine a position of the mobile device. Various methods are known from the prior art in order to determine a position of a mobile device. By way of example, an individual position of the mobile device may be determined by way of satellite-based position determination, by way of trilateration or by way of a Kalman filter. These methods known from the prior art use a single measured position to determine the position of the mobile device.

One object of the invention is therefore to efficiently improve position determination of a mobile device, in particular of a mobile terminal, relative to a vehicle.

According to a first aspect, the invention is distinguished by a method for determining a location area of a mobile terminal relative to a vehicle. The location area may comprise a region in which the mobile terminal is situated with a predefined confidence or with a predefined confidence value. Determining a location area may comprise providing the location area to a component and/or a function of the vehicle. The mobile terminal may be a smart device, for example a smartphone or a smartwatch, and/or a wearable device, for example a key, a vehicle key, a card, augmented reality glasses or generally a tag carried by a person. The vehicle may be a land vehicle, for example a motor vehicle or a motorcycle.

The method comprises generating a set of positions relative to the vehicle. A position may be a possible whereabouts of the mobile terminal. The set of positions may comprise a predefined number of positions. The predefined number may vary depending on the vehicle, on the mobile terminal, on surroundings of the vehicle and/or on a vehicle function. The set of positions may be generated in preferably nearby surroundings of the vehicle. The surroundings of the vehicle may be defined by a transmission/reception range of a wireless interface and/or by a predefined, vehicle-specific or surroundings-specific distance parameter. A position may be generated relative to the vehicle and/or one or more reference points of the vehicle. A reference point may be for example an antenna of a wireless interface, a measurement point and/or a position of a sensor. The vehicle preferably comprises a plurality of reference points.

The method furthermore comprises calculating a location probability of the mobile terminal for one position from the set of positions. The method may preferably calculate the location probability of the mobile terminal for all positions from the set of positions. The method furthermore comprises assigning one position from the set of positions to one zone from a multiplicity of zones of the vehicle. The method may preferably assign all positions from the set of positions to no zone or precisely one zone of the vehicle. If the method does not assign a zone to a position, this position is no longer considered in the further course of the method. A position may be assigned to a zone by mapping a position onto a zone.

A zone of a vehicle may be vehicle-specific. The vehicle preferably comprises at least two zones, preferably more than two zones, for example 3, 4, 5, 6, 7, etc. zones. By way of example, a zone may comprise an interior of a vehicle, an outside space for a right-hand door, an outside space for a left-hand door or a trunk. A zone may comprise a freely selectable space in the interior or outer space of the vehicle. A zone of a vehicle is preferably predefined. A function of a vehicle may be linked to a zone. A zone may be defined so as to be two-dimensional or three-dimensional. A zone of the vehicle may be defined relative to the vehicle. A zone of the vehicle may be defined relative to one or more reference points of the vehicle.

The method furthermore comprises determining an aggregated location probability of the mobile terminal for one zone from the multiplicity of zones depending on the positions assigned to the zone. The method preferably determines the aggregated location probability of the mobile terminal for all zones of the vehicle. If the aggregated location probability of the mobile terminal for one zone from the multiplicity of zones exceeds a predefined confidence value, the method determines this zone as the location area of the mobile terminal. The confidence or the confidence value is preferably a threshold value that is defined depending on a vehicle function and/or a type of vehicle function. The confidence value may be defined in a vehicle-specific and/or surroundings-specific manner. A confidence value of 90% may mean for example that 90% of the positions from the set of positions have to be assigned to a particular zone in order for this zone to be determined as the location area of the mobile device.

A location area of a mobile terminal relative to a zone of the vehicle may advantageously be determined more precisely without knowing a precise whereabouts or a precise position of the mobile terminal. By using a set of positions, it is possible to achieve a better assignment of the mobile terminal in the boundary area of adjacent zones. An erroneous assignment of the mobile terminal to a zone is therefore able to be efficiently avoided. A position determination of the mobile terminal relative to a vehicle is therefore able to be efficiently improved.

According to one advantageous refinement, calculating a location probability of the mobile terminal for one position from the set of positions may comprise measuring a distance of the mobile terminal relative to the vehicle and determining the location probability of the mobile terminal for the position by way of a nonlinear probability density function depending on the measured distance of the mobile terminal. A location probability of the mobile terminal for one or all positions from the set of positions is thereby able to be efficiently determined.

According to a further advantageous refinement, determining an aggregated location probability of the mobile terminal for a zone may comprise determining a number of assigned positions of the zone, calculating a ratio from the number of assigned positions of the predefined zone and an overall number of positions from the set of positions, and determining the calculated ratio as the aggregated location probability of the mobile terminal for the predefined zone. It is thereby possible to efficiently determine what proportion of positions from the set of positions lie in a particular zone.

According to a further advantageous refinement, the method may furthermore comprise adjusting one or more positions from the set of positions by way of a movement model in order to generate a new set of positions. The method may furthermore comprise calculating a location probability of the mobile terminal for one position from the new set of positions, and removing one or more positions from the new set of positions whose calculated location probability does not exceed a predefined minimum location probability. The predefined minimum location probability may be vehicle-specific and/or function-specific. The method may furthermore comprise generating new positions, such that an overall number of positions of the new set of positions matches an overall number of positions of the set of positions, adding the new positions to the new set of positions, and assigning one position from the new set of positions to one zone from the multiplicity of zones of the vehicle. The method may preferably assign a subset of the positions or all of the positions from the new set of positions to a zone. The method may furthermore comprise determining an aggregated location probability of the mobile terminal for a zone depending on the positions assigned from the new set of positions to the zone. If the aggregated location probability of the mobile terminal for a zone exceeds the predefined confidence value, the method may determine the zone as the location area of the mobile terminal. One or more positions from the set of positions may thereby be adapted iteratively to the movement of the mobile terminal, such that it is possible to achieve convergence of the method. A more precise assignment of the mobile terminal to a zone is thereby able to be efficiently achieved.

According to a further advantageous refinement, the movement model may adjust the positions from the set of positions randomly and/or on the basis of movement sensor data of the mobile terminal, and the new positions may preferably be generated in close surroundings of positions from the new set of positions. A determination of the location area of the mobile terminal is thereby able to be efficiently improved.

According to a further advantageous refinement, the method may furthermore comprise, if the aggregated location probability of the assigned positions of a zone does not exceed a predefined confidence value and a predefined number of non-exceedances of the predefined confidence value is reached, stopping the determination of the location area of the mobile terminal. The method may thereby be ended if it is not possible to find a zone with the predefined confidence value.

According to a further aspect, the invention is distinguished by a computer-readable medium for determining a location area of a mobile terminal, the computer-readable medium comprising instructions that execute the above-described method when they are executed on a controller or a computer.

According to a further aspect, the invention is distinguished by a system for determining a location area of a mobile terminal, wherein the system comprises means for executing the above-described method.

According to a further aspect, the invention is distinguished by a vehicle comprising the above-described system for determining a location area of a mobile terminal.

Further features of the invention emerge from the claims, the figures and the description of the figures. All of the features and combinations of features mentioned above in the description and the features and combinations of features mentioned below in the description of the figures and/or just shown in the figures are able to be applied not only in the respectively specified combination but also in other combinations or else on their own.

One preferred exemplary embodiment of the invention is described below with reference to the attached drawings. Further details, preferred refinements and developments of the invention emerge therefrom. Individually:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
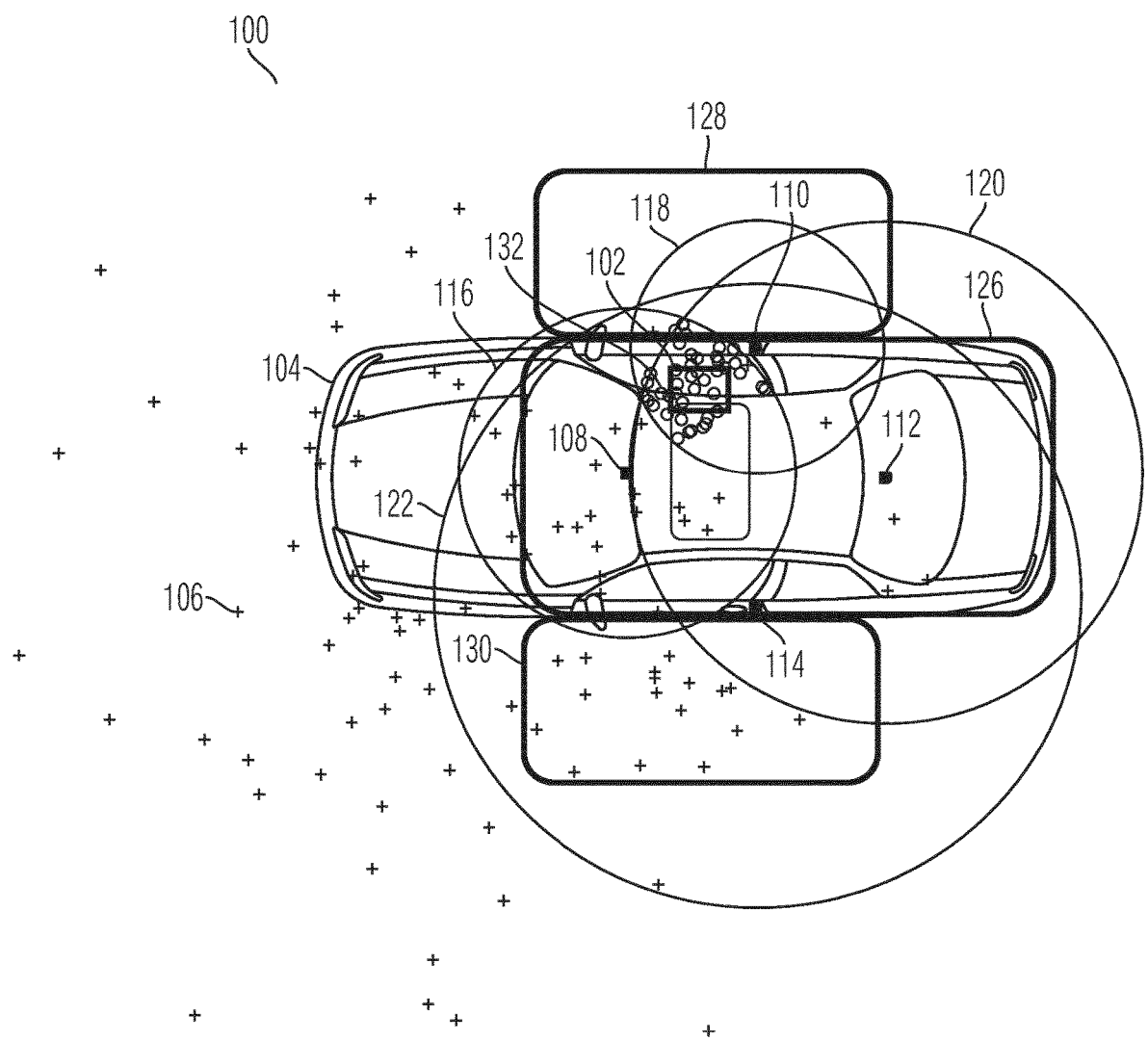
FIG. 1 schematically shows one exemplary scenario of a method for determining a location area of a mobile terminal relative to a vehicle.

In detail, FIG. 1 shows one exemplary scenario 100 of a method for determining a location area of a mobile terminal 102 relative to a vehicle 104. The method may be executed in a controller or a combination of controllers of the vehicle 104. A mobile terminal 102, for example a smartphone, may be used to trigger a vehicle function, for example to activate or to deactivate a vehicle access system or to authenticate an engine start. A location area of the mobile terminal 102 relative to the vehicle 104 needs to be determined in order to be able to trigger a vehicle function. The method may generate a set of positions relative to the vehicle 104. The set of positions may initially be generated randomly. As shown in FIG. 1, the positions of the initial set of positions are marked with a plus sign. By way of example, 106 makes reference to one position from the initial set of positions.

Figure 2:
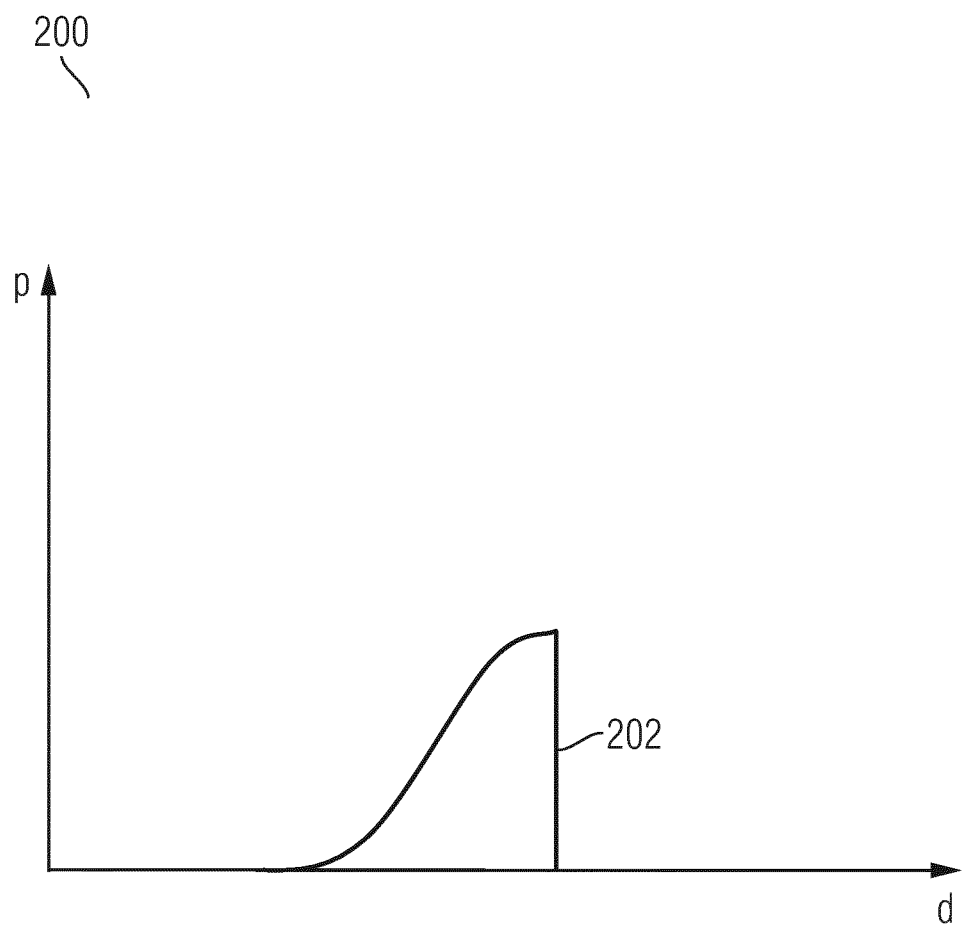
FIG. 2 schematically shows a first exemplary probability density function.

The method is able to calculate a location probability of the mobile terminal 102 for one position 106 from the set of positions. Calculating the location probability may comprise measuring a distance of the mobile terminal 102 relative to the vehicle 104. The distance of the mobile terminal may be measured relative to one or more reference points 108, 110, 112, 114 of the vehicle 104. A reference point 108, 110, 112, 114 may be for example a measurement point or an antenna of the vehicle 104. As illustrated in FIG. 2, each reference point 108, 110, 112, 114 performs a measurement in order to determine the distance of the mobile terminal 102 relative to the respective reference point. The reference point 108 measures the distance 116, the reference point 110 measures the distance 118, the reference point 112 measures the distance 120, and the reference point 114 measures the distance 122.

The distance may be measured by way of radio technology that is able to perform time-of-flight (TOF) measurements at high frequencies, for example frequencies of 2.4 GHz and higher. In the case of a distance measurement at high frequencies, reflection, shading and/or diffraction properties may occur that may influence a result of the distance measurement. The distance measurement may therefore comprise two states:

line of sight (LOS): the distance measurement corresponds to a shortest distance between the mobile terminal 102 and the vehicle 104, in particular a reference point 108, 110, 112, 114 of the vehicle 104; or non-line of sight (NLOS): the distance measurement corresponds to a distance longer than a shortest distance between the mobile terminal 102 and the vehicle 104, in particular a reference point 108, 110, 112, 114 of the vehicle 104.

In a measurement of the distance of the mobile terminal 102 from the vehicle 104, it is often not known whether the distance measurement is an LOS measurement or an NLOS measurement. A distance measurement using TOF radio technology may lead to an actual distance of the mobile terminal 102 from the vehicle 104 being able to be shorter than the measured distance, for example in the case of an NLOS measurement, but not being able to be longer than the measured distance, for example in the case of an LOS measurement.

To determine a location probability of the mobile terminal 102 for one position from the set of positions, it is possible to use a nonlinear, in particular non-Gaussian, probability density function depending on the measured distance of the mobile terminal 102. Each position from the set of positions is preferably evaluated by way of a probability density function in order to determine a location probability of the mobile terminal 102 for a position.

The location probability density function may be uniform or different for each of the measured distances of the mobile terminal 102. In the scenario of FIG. 1, four distances 116, 118, 120 and 122 are measured. A uniform or different probability density function may thus be used for each of the measured distances in order to determine a location probability of one position from the set of positions relative to the respective measured distance. It is possible for example to determine location probabilities relative to the measured distances 116, 118, 120 and 122 for one position 124 from the set of positions.

The method may furthermore assign one position from the set of positions to one zone 126, 128, 130 from a multiplicity of zones 126, 128, 130 of the vehicle 104. The vehicle 104 from FIG. 1 has three exemplary zones: an interior zone 126, a zone 128 on the right-hand side of the vehicle 104, and a zone 130 on the left-hand side of the vehicle 104. The zones 126, 128, 130 of the vehicle 104 may be predefined. By way of example, the zones 126, 128, 130 of the vehicle 104 may be defined relative to the reference points 108, 110, 112 and 114 of the vehicle 104. The zones 126, 128, 130 may be defined so as to be two-dimensional or three-dimensional.

A position 124 may be assigned to a zone 126, 128, 130 of the vehicle 104 by checking whether the position 124 lies within the zone 126, 128, 130. If a position 124 lies within the zone 126, the position 124 is assigned to the zone 126. All of the positions are preferably either not assigned to a zone, if for example no zone is defined at the position, for example at position 106, or assigned to precisely the zone that is defined at the position, for example at position 124. Depending on a vehicle function, more or fewer zones 126, 128, 130 may be defined, dimensions of the zones 126, 128, 130 may vary, and/or boundaries between the zones 126, 128, 130 may be different.

Positions assigned to a zone 126, 128, 130 may be used to determine an aggregated location probability of the mobile terminal 102 for this zone 126, 128, 130. The aggregated location probability may be defined as a location probability of the mobile terminal on the basis of a particular number or all positions assigned to a zone. To determine the aggregated location probability, a number of the positions assigned to this zone may be determined and divided by the overall number of positions from the set of positions in order to obtain a ratio of the positions assigned to this zone relative to the overall number of positions. This ratio corresponds to the aggregated location probability of the mobile terminal. By determining the above-described ratio, it is advantageously possible to determine the aggregated location probability of the mobile terminal 102. If the overall number of positions is for example 100 positions and 90 positions are situated within a particular zone, 90 percent of the positions are within this zone. If 90 percent of the positions are within a particular zone, the aggregated location probability is 90 percent. The mobile terminal 102 is therefore situated within this zone with an aggregated location probability of 90 percent.

If the aggregated location probability of the mobile terminal 102 for one zone 126, 128, 130 from the multiplicity of zones 126, 128, 130 exceeds a predefined confidence value, the method may determine the zone 126, 128, 130 as the location area of the mobile terminal 102. The predefined confidence value may be defined depending on a vehicle function. By way of example, critical vehicle functions such as for example the starting of an engine or the activation of vehicle access may require a high confidence or a high confidence value. Less critical vehicle functions, such as for example adjusting a seat or customizing an infotainment system, may require a lower predefined confidence value.

By comparing the aggregated location probability with a predefined confidence value, the method is able to make various decisions. If the aggregated location probability is equal to the predefined confidence value or exceeds the predefined confidence value, the assignment of the mobile terminal 102 to this zone is valid. The zone therefore constitutes the location area of the mobile terminal 102. If the aggregated location probability is not equal to the predefined confidence value or does not exceed the predefined confidence value, it is not possible to decide on the location area of the mobile terminal 102. The method may however be executed iteratively in order to determine the location area of the mobile terminal on the basis of an at least partly new set of positions. A number of iterations of the method may be predefined. If the aggregated location probability does not equal the predefined confidence value or does not exceed the predefined confidence value and a predefined maximum number of iterations is exceeded, the method may stop determining the location area of the mobile terminal. A decision about the location area of the mobile terminal 102 for a zone with the predefined confidence value is not able to be made by the method. The positions assigned to a zone are not valid. A zone for the mobile terminal 102 is not able to be determined.

An iterative execution of the method is described below. The method has already been initially executed as described above. In the initial execution of the method, however, it was not possible to determine an aggregated location probability of the mobile terminal 102 that equals the predefined confidence value or exceeds the predefined confidence value. It was therefore also not possible to determine a valid zone for the mobile terminal.

In detail, the method is able to select and/or change positions from the initial set of positions and use these positions as a basis for the further method in an iterative execution of the method.

A subset or all of the positions from the set of positions may be adjusted by way of a movement model in order to generate a new set of positions. By way of example, the subset of the positions from the set of positions may be determined by determining positions from the set of positions that have at least a predefined minimum location probability. Positions from the set of positions that do not exceed the predefined minimum location probability may no longer be considered. By way of example, the positions from the set of positions that do not exceed the predefined minimum location probability may be removed from the set of positions. By adjusting the positions using the movement model, it is possible to map a movement of the mobile terminal 102. The movement model for the positions may be selected freely. A position is generally adjusted by the movement model by a movement that is random, is to be estimated and/or is measured. By way of example, the movement model may be a stochastic movement model. By way of example, the movement model may adjust the position using a random number, without taking into account a state of a movement direction, in order to reduce a computational burden for adjusting the positions. After adjusting the positions, using the distance of the position to one or more reference points and the associated probability density function, it is possible to calculate, preferably for each position, a location probability, in particular a current location probability. Positions having a low location probability may be removed from the new set of positions. The adjusted positions may furthermore be added to a new set of positions.

The method may furthermore generate one or more new positions, such that an overall number of positions of the new set of positions and an overall number of positions of the set of positions match. The method may therefore apply to the same number of positions, even at each iteration of the method. The new positions may preferably be generated in close surroundings of the adjusted positions. This may increase convergence of the method. The new positions may likewise be added to the new set of positions. The new set of positions therefore comprises the same number of positions as the initial set of positions.

The further steps of the iterative execution correspond to the steps of the initial execution of the method. In detail, a location probability of the mobile terminal is calculated for one position from the new set of positions, one position from the new set of positions is assigned to one zone from the multiplicity of zones of the vehicle, and an aggregated location probability of the mobile terminal is calculated for a zone depending on the positions assigned from the new set of positions to the zone. If the aggregated location probability of the mobile terminal for a zone exceeds the predefined confidence value, the zone is determined as the location area of the mobile terminal. Otherwise, the method may be iteratively executed again until a zone having the required confidence value is determined or the maximum number of iterations is reached. In FIG. 1, the positions that represent a location area of the mobile terminal after one or more iterative executions of the method are marked with a circular symbol. One exemplary position is referenced 132.

The positions marked with the circular symbol mostly lie in the interior zone 126. The positions marked with the circular symbol therefore meet the predefined confidence value. The determined zone of the mobile terminal 102 is therefore the interior zone 126 of the vehicle 104.

Figure 3:
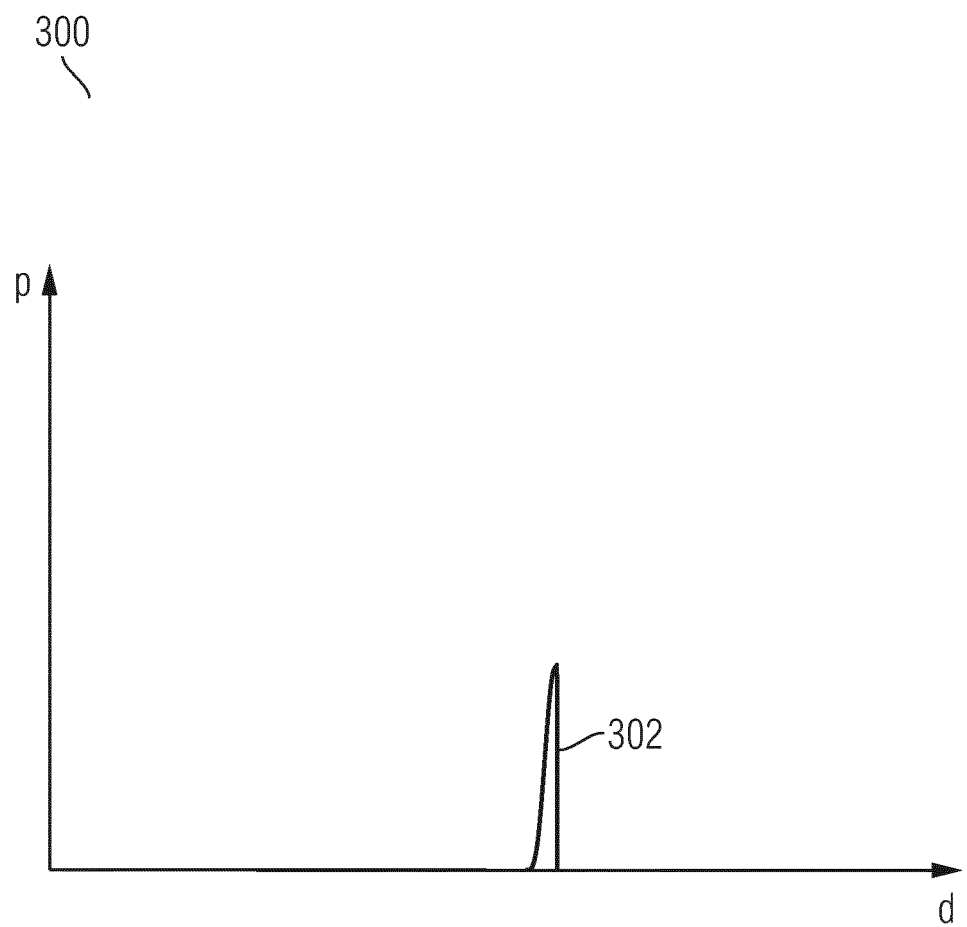
FIG. 3 schematically shows a second exemplary probability density function.
Figure 4:
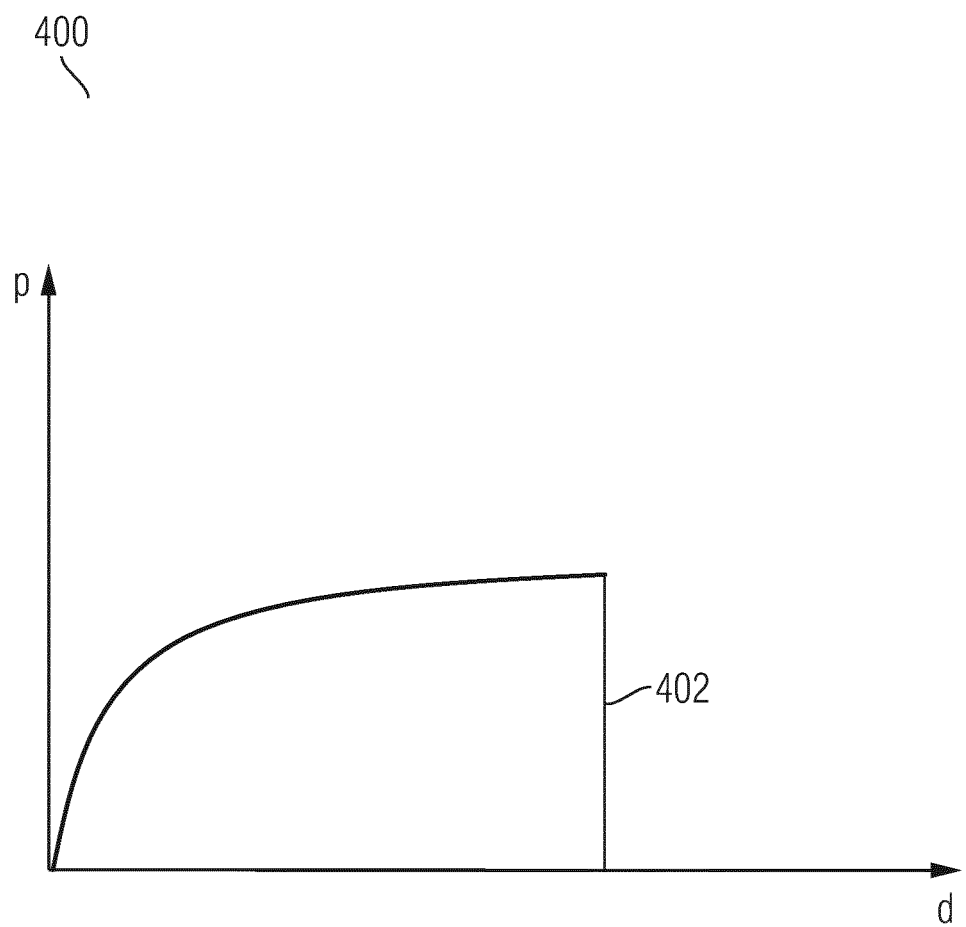
FIG. 4 schematically shows a third exemplary probability density function.

FIGS. 2, 3 and 4 show exemplary probability density functions for determining a location probability of the mobile terminal for one position from the set of positions. In detail, FIG. 2 shows an exemplary probability density function for a case in which it is not known whether the distance measurement is an LOS or an NLOS measurement. The measured distance of the mobile terminal 102 is referenced 202 in FIG. 2. The location probability of the mobile terminal 102 is highest at a position that lies close to the measured distance of the mobile terminal 102, and decreases with increasing distance of the position from the measured distance. A position that lies further away than the measured distance of the mobile terminal 102 has the location probability 0.

In detail, FIG. 3 shows a probability density function for a case in which it is known that the distance measurement is an LOS measurement. The measured distance of the mobile terminal 102 is referenced 302 in FIG. 3. The location probability of the mobile terminal 102 is highest at a position that lies close to the measured distance, and decreases quickly with increasing distance of the position from the measured distance. A position that lies further away than the measured distance of the mobile terminal has the location probability 0.

In detail, FIG. 4 shows a probability density function for a case in which it is known that the distance measurement is an NLOS measurement. The measured distance of the mobile terminal 102 is referenced 402 in FIG. 4. The location probability of the mobile terminal 102 is highest at a position that lies close to the measured distance, and decreases only slowly with increasing distance of the position from the measured distance. Positions that are further away are thereby also assigned a high location probability. The measured distance has only a small influence on the location probability of a position. A position that lies further away than the measured distance of the mobile terminal 102 has the location probability 0.

A location area of a mobile terminal, without knowledge about an error in the measured distance of the mobile terminal, may be accurately determined by the above-described method. It may furthermore be determined whether the method converges and therefore a valid zone is able to be determined or whether the method does not converge and no valid zone is able to be determined. The method is therefore able to efficiently recognize undecidable situations. The position determination of a mobile terminal is thus able to be precisely determined to be correct relative to the vehicle with respect to a zone. Location areas of the mobile terminal are able to be efficiently mapped onto zones and an assignment to a zone is able to be determined quickly.

LIST OF REFERENCE SIGNS

100 scenario
102 mobile terminal
104 vehicle
106 position from the initial set of positions
108 reference point
110 reference point
112 reference point
114 reference point
116 measured distance 118 measured distance
120 measured distance
122 measured distance
124 position from the initial set of positions
126 zone
128 zone
130 zone
132 position from the new set of positions
200 probability density function
202 measured distance
300 probability density function
302 measured distance
400 probability density function
402 measured distance The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a location area of a mobile terminal relative to a vehicle, the method comprising:
generating a set of positions relative to the vehicle, wherein each position in the set of positions is a possible location of the mobile terminal;
calculating a location probability of the mobile terminal for one position from the set of positions;
assigning one position from the set of positions to a zone from a plurality of zones of the vehicle;
determining an aggregated location probability of the mobile terminal for the zone from the plurality of zones depending on the positions assigned to the zone; and
when the aggregated location probability of the mobile terminal for the zone exceeds a predefined confidence value, the method further comprises determining the zone as the location area of the mobile terminal;
wherein determining an aggregated location probability of the mobile terminal for the zone comprises:
determining a number of assigned positions of the zone;
calculating a ratio from the number of assigned positions of the zone and an overall number of positions from the set of positions; and
determining the calculated ratio as the aggregated location probability of the mobile terminal for the zone.

2. The method according to claim 1, wherein calculating a location probability of the mobile terminal for one position from the set of positions comprises:
measuring a distance of the mobile terminal relative to the vehicle; and
determining the location probability of the mobile terminal for the position using a nonlinear probability density function depending on the measured distance of the mobile terminal.

3. The method according to claim 1, the method further comprising:
when the aggregated location probability of the assigned positions of the zone does not exceed a predefined confidence value and a predefined number of non-exceedances of the predefined confidence value is reached,
stopping the determination of the location area of the mobile terminal.

4. A method for determining a location area of a mobile terminal relative to a vehicle, the method comprising:
generating a set of positions relative to the vehicle, wherein each position in the set of positions is a possible location of the mobile terminal;
calculating a location probability of the mobile terminal for one position from the set of positions;
assigning one position from the set of positions to a zone from a plurality of zones of the vehicle;
determining an aggregated location probability of the mobile terminal for the zone from the plurality of zones depending on the positions assigned to the zone;
when the aggregated location probability of the mobile terminal for the zone exceeds a predefined confidence value, the method further comprises determining the zone as the location area of the mobile terminal;
adjusting one or more positions from the set of positions by way of a movement model in order to generate a new set of positions;
calculating a location probability of the mobile terminal for a position from the new set of positions;
generating new positions such that a number of positions of the new set of positions matches an overall number of positions of the set of positions;
adding the new positions to the new set of positions;
assigning one position from the new set of positions to a further zone from the plurality of zones of the vehicle;
determining an aggregated location probability of the mobile terminal for the further zone depending on the positions assigned from the new set of positions to the further zone;
when the aggregated location probability of the mobile terminal for the further zone exceeds the predefined confidence value, the method further comprises determining the further zone as the location area of the mobile terminal.

5. The method according to claim 4, wherein the movement model adjusts the positions from the set of positions randomly and/or on the basis of movement sensor data of the mobile terminal; and
wherein the new positions are preferably generated in close surroundings of positions from the new set of positions.

6. A non-transitory computer-readable medium for determining a location area of a mobile terminal, the non-transitory computer-readable medium comprising instructions that, when executed by a processor, are configured to:
generate a set of positions relative to the vehicle, wherein each position in the set of positions is a possible location of the mobile terminal;
calculate a location probability of the mobile terminal for one position from the set of positions;
assign one position from the set of positions to a zone from a plurality of zones of the vehicle;
determine an aggregated location probability of the mobile terminal for the zone from the plurality of zones depending on the positions assigned to the zone; and
when the aggregated location probability of the mobile terminal for the zone exceeds a predefined confidence value, determine the zone as the location area of the mobile terminal;
wherein determining an aggregated location probability of the mobile terminal for the zone comprises:
determining a number of assigned positions of the zone;
calculating a ratio from the number of assigned positions of the zone and an overall number of positions from the set of positions; and
determining the calculated ratio as the aggregated location probability of the mobile terminal for the zone.

7. A vehicle comprising a system configured to determine a location area of a mobile terminal, wherein the system is configured to:
  generate a set of positions relative to the vehicle, wherein each position in the set of positions is a possible location of the mobile terminal;
  calculate a location probability of the mobile terminal for one position from the set of positions;
  assign one position from the set of positions to a zone from a plurality of zones of the vehicle;
  determine an aggregated location probability of the mobile terminal for the zone from the plurality of zones depending on the positions assigned to the zone; and
  when the aggregated location probability of the mobile terminal for the zone exceeds a predefined confidence value, determine the zone as the location area of the mobile terminal;
  wherein determining an aggregated location probability of the mobile terminal for the zone comprises:
  determining a number of assigned positions of the zone;
  calculating a ratio from the number of assigned positions of the zone and an overall number of positions from the set of positions; and
  determining the calculated ratio as the aggregated location probability of the mobile terminal for the zone.

* * * * *